M. G. KELLOGG.
MULTIPLE SWITCHBOARD.
No. 11,388. Reissued Nov. 14, 1893.
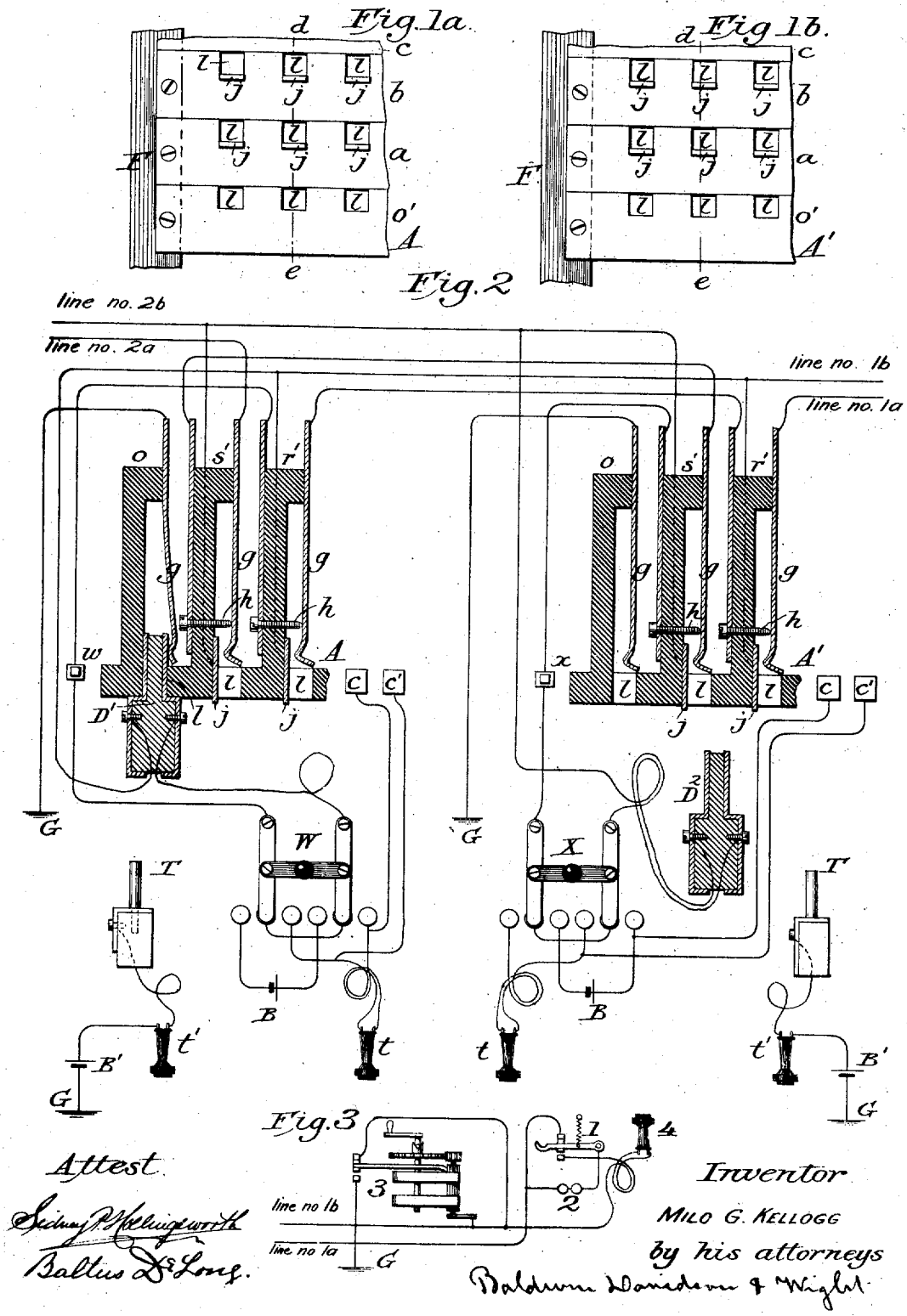
THE NORRIS PETERS CO., PHOTO-LITHO., WASHINGTON, D. C.

UNITED STATES PATENT OFFICE.

MILO G. KELLOGG, OF CHICAGO, ILLINOIS.

MULTIPLE SWITCHBOARD.

SPECIFICATION forming part of Reissued Letters Patent No. 11,388, dated November 14, 1893.

Original No. 393,508, dated November 27, 1888. Application for reissue filed January 23, 1891. Serial No. 378,853.

*To all whom it may concern:*

Be it known that I, MILO G. KELLOGG, formerly of Hyde Park, and now of Chicago, Illinois, have invented certain new and useful Improvements in Multiple Switchboards for Telephone-Exchanges, of which the following is a full, clear, concise, and exact description, reference being had to the accompanying drawings, forming a part of this specification.

My invention relates to a metallic-circuit telephone exchange system; and it consists, first, in a system of testing at one board of a multiple-switch-board system to determine whether a line is in use at another board, which system I shall hereinafter describe and claim in detail.

It consists, secondly, of apparatus and a system of connecting said wires to the apparatus, whereby one loop switch-plug only is required for making the connections between two such wires, and whereby the calling annunciator of the subscriber who made the call may be utilized as the clearing out annunciator of the circuit of two subscribers' lines connected together while the calling-annunciator of the subscriber who was called is switched from the circuit, which apparatus and system of connections I shall hereinafter describe and claim in detail.

It consists, thirdly, of certain apparatus for switching, answering, calling, and clearing out subscribers' lines, which I shall hereinafter describe and claim in detail.

Figures $1^a$ and $1^b$ of the drawings are front views of sections of two multiple switchboards to which the same wires are connected. Fig. 2 shows a complete diagram of the boards with their circuits, apparatus, and connections necessary to operate them according to my invention. Fig. 3 shows a diagram of the subscriber's station apparatus used in the system.

In my invention I place on each board for each line a spring-jack switch or suitable device connected to the lines and apparatus, substantially as hereinafter described. For each line I use, or may use, a calling annunciator in the central office, and these annunciators are distributed among the different boards, so that the calls may be readily answered and attended to. The switching apparatus of a line on the board where its calls are to be attended to is different, and is connected differently from the switching apparatus of the line on the other boards. At this board the line terminates on both sides in a double or loop cord and a double or loop plug. This plug is normally, or when the line is not switched for conversation, placed in a switching device, or otherwise placed so that one of the sides of the line is grounded, and when the plug is withdrawn from the switching device or taken from its place the ground connection is removed from the line. This side of the line also passes through spring-jack or similar switches at all of the boards, these switches being connected in the circuit between the switch-plug and the subscriber's station, and so constructed and connected that when a switch plug is inserted into any switch it disconnects the side heretofore mentioned from the ground and connects it to one of the contact pieces of the plug. The other side of the line is normally open at the central office, and is connected at each board to a contact piece suitably placed and adapted to be brought into connection with a test-plug, which forms the terminal of a test wire or circuit at that board grounded at its other end. In this test-wire is a test-receiving instrument and a test-battery of suitable character.

The side of the line which is normally open at the central office is also connected at its switch at each board to a contact piece suitably placed and adapted to be brought into connection with the other contact piece of the double plug when the plug is inserted into the switch. The contact-pieces to which the test-plugs are to be applied and the switch contact-pieces last above mentioned may be one and the same piece, as shown in the drawings.

The calling-annunciator of a line is connected into the circuit of that side of the line which is grounded and is placed between the plug and the switches of the line.

On each board I place in convenient positions one or more switching devices, each having two contact pieces, and adapted, at the will of the operator, to be brought into electrical connection with the two contact pieces, respectively, of any loop-plug located at the board. At each board I also place in convenient positions switching devices adapted to loop a calling-generator and an operator's telephone in the circuit of any line which has its loop-plug located at that board.

In Fig. 2 of the drawings two metallic circuit lines are shown, and they are connected to the switches and apparatus on the two boards shown in such a manner as to allow all the necessary operations of a telephone exchange system, and at the same time show the principles of my invention. The two sides of one line are marked "Line No. $1^a$" and "Line No. $1^b$." Line No. $1^a$ is the side normally grounded at the central office and line No. $1^b$ is the side normally open at the central office. The sides of the other line are marked "Line No. $2^a$" and "Line No. $2^b$."

*r* and *r'* are the two spring-jack switches of line No. 1 at the two boards, and *s* and *s'* are the two spring-jacks of line No. 2 at the two boards.

*g g*, &c., are the spring contact-pieces of the switches.

*h h* are the contact-pieces on which the springs normally rest.

*j j*, &c., are the contact-pieces of the lines on the different boards to which the test-plugs may be applied. They are also the pieces which form the connection between one side of the plug and the open end of a line when a plug is inserted into a switch.

*o o* are switching devices, in which the plugs are normally placed, and which ground one side of a line attached to a plug when so placed, as shown and as heretofore indicated.

*w* and *x* are calling-annunciators for the two lines, *w* being for line No. 1 and located at board A, where the double plug and cord of that line are also located and where its calls are to be answered, *x* being for line No. 2 and located at board A', where its double plug and cord are located and its calls are to be answered.

D' and $D^2$ are two loop plugs attached to double flexible cords, D' being for line No. 1 and $D^2$ for line No. 2. The plugs D' and $D^2$ should normally be in switches *o o* at their respective boards in such a position that the side of their lines in which are the switches and annunciator of the lines is normally grounded.

W and X are two looping-in switches for the lines, connected to their circuits and the other apparatus, substantially as shown.

B B at the two boards are calling-generators or batteries, and *t t* are operators' telephones. There should be one looping-in switch for each line, each at the board where the calls of the line are to be answered, and they should be connected to the operator's telephone and generator of the operator who attends to the calls of the lines in the way substantially as shown and as will be apparent to those skilled in the art.

TT at the two boards are test-plugs attached to flexible cords, and adapted to be brought into connection with the pieces *j j* at their respective boards.

*t' t'* are test-receiving instruments, and B' B' are test-batteries at the two boards.

G in each case in the drawings is a ground connection.

C C are switching devices at the two boards, the contact-pieces *c c'* of each of which are connected to the two sides of the operator's telephone at its board, and are adapted to be brought into connection, at the will of the operator, with the two contact-pieces of any loop-plug located at the board. These switching devices may be made as shown, or of other appropriate forms of construction.

The main line connections are substantially as shown and as have been heretofore indicated.

In the subscriber's station apparatus shown in Fig. 3, (of which there should be one at each subscriber's station,) 1 is the telephone-switch, 2 is the signal-bell, 3 is the calling-generator, and 4 is the subscriber's telephone. These parts may be the usual forms of apparatus, and are connected as shown, or in other known ways. The calling-generator is, however, modified, as will hereinafter be described.

The generator has an automatic device, (shown in the drawings) by which, when the crank is not in motion, the wire of the armature is shunted and the line is disconnected from the ground at the subscriber's station, and when the generator is turned or operated the shunt is automatically removed and the line is temporarily connected to the ground. The automatic device shown is a modification of a form very generally used, the modification being substantially in the arrangement of the contact points. It contains a V-shaped attachment to the hub of the driving-wheel, a pin in the shaft, which engages in the V-shaped arrangement, and a spring which presses against the wheel and brings the pin normally in the center of the V arrangement. The contact-points are substantially as shown, and as will produce the switching operations above described. This apparatus should be connected in the circuit of a line in such a position that when the generator is operated the armature is in circuit between the ground then established at the subscriber's station and the central office ground of the line heretofore mentioned.

It will be seen that each of the looping-in switches W and X have a pair of movable levers and three pairs of contact-bolts, on which respectively, the levers of the switch may be placed, and that each of these pairs of contact-bolts is connected by a loop. In one of the loops is a calling generator or battery, and in another loop is an operator's telephone. The third loop contains nothing. The operator can, therefore, by moving the levers of the switch to the three pairs of contact-bolts, as desired, loop either the battery or the telephone into the circuit with the line to which the switch belongs, or connect the line through the switch without either instrument being in its circuit.

The operation of the system is as follows: When a subscriber operates his generator to send in a signal, he grounds his line with its armature and the calling annunciator at the central office in circuit between the office ground and his own ground, thereby operating the annunciator. The operator then removes the plug which belongs to the line from its normal position, and, placing its two contact-pieces on the two contact-pieces of switching device C at her board, finds out what line is wanted. She then tests the line wanted to see whether it is in use at another board, and if it is not in use she places the plug of the line calling into the switch of the line which is wanted, and by operating the loop switch connected with the plug sends a calling signal through the circuit. The two lines are thus disconnected from the ground and are connected together in metallic circuit for conversation, and the subscriber who is wanted has been called. Clearing out signals now sent by either subscriber will be received on the calling annunciator of the line in which the call originated and whose double plug is being used for the connection. It will be noticed that when the lines are connected together, as indicated, the calling annunciator of the line whose plug is in use is in their circuit and the annunciator of the other line is not in the circuit.

Each of the metallic circuit lines is normally (or when the line is not switched for use) connected through one of its plug contacts with one side of each of the test-receiving instruments at the several boards. When the line is temporarily switched for conversation, said connection of the line with the test-receiving instruments is broken. The other side of each test-receiving instrument is connected with a test-plug adapted to be brought into connection with any line at its board. In the circuit of the instruments, between their test-plugs and their normal connections with the lines, is a test battery, (or batteries.) It will be apparent from this description that when a line is tested and is not switched there will be a complete circuit through the battery and the test-receiving instrument, and the latter would sound or respond and when the line is switched there will be no such complete circuit, and the instrument will not respond. In the organization shown the test battery is placed between the switch testing plug and its ground connection, and this constitutes another feature of my invention.

For convenience in carrying out the testing system, in connection with the calling and switching systems I employ, the test receiving instruments are normally connected on one side to the lines through the ground, and by the operation of switching the lines, as described, they are temporarily disconnected from the ground and therefore from the test-receiving instruments. In such a system, with such normal connection through the ground between the test-receiving instruments and the lines, broken when the lines are switched, it is imperative that the lines be not grounded at any other point when they are switched. In order to obtain this, and at the same time operate the calling annunciators placed as described I employ the automatic attachment heretofore described for the generators, which temporarily ground the lines for signaling as described.

The testing system is as follows: Each line is normally grounded at the central office only, and there as indicated. When a line is switched for conversation with another line, either by the use of its double plug or at one of its line-switches, as indicated, it is disconnected from the ground, and when a test plug T, is applied to one of the pieces *j* of the line at either board when it is thus switched, the test-receiving instrument connected with the plug will not respond, because there is then no complete circuit. The operator will know by the instrument not responding that the line is in use. If, when she applies the test plug as above to the piece *j* of any line and the line is not switched for conversation, there is a complete circuit from the ground through the test-receiving instrument and battery to the test plug, and thence through the line tested to the ground connection of the line, the test-receiving instrument will then respond, indicating that the line is not in use.

I claim as my invention and desire to secure by Letters Patent—

1. In a telephone-exchange system, metallic circuit telephone lines, line switching devices at the central office—one for each line—each switch containing three contact pieces, two of which are normally in contact, one of said pieces which are normally in contact being connected with one side or branch of its line, and the third contact piece being insulated from the others and connected to the other side or branch of its line, in combination with double or loop plugs with double flexible conductors—one for each line—the two conductors of each cord being attached to the two contact-pieces of its plug, respectively, and the other ends of the conductors being attached to the two sides or branches of their line, respectively, ground switching devices for said plugs, and calling annunciators for said lines, each of said plugs being adapted to be inserted into any of said line-switches, and when inserted to disconnect the two switch contact pieces which are normally in contact and connect the two contact-pieces of the plug with the two contact-pieces of the switch, respectively, which are connected to the two sides or branches of the line, each of said plugs being normally in position with one of said ground switching devices, whereby one of its contact-pieces is normally grounded, said two contact-pieces of a switch which are normally in contact being in the circuit of its line between its subscriber's station and the contact-piece of its plug which is normally grounded, and the annunciator of a line being in the circuit of the line between said two normally-closed contact-pieces of the switch and said normally grounded contact-piece of its plug, substantially as and for the purpose set forth.

2. In a telephone-exchange system, metallic circuit telephone lines, multiple switch boards for said lines, line switching devices for said lines,—one for each line on each board—each switch containing three contact-pieces, two of which are normally in contact, the contact-pieces of the switches of a line which are normally in contact being in the circuit of one of the sides or branches of the line and the other contact pieces of the switches of a line being connected to the other side or branch of the line, in combination with double or loop plugs with double flexible cords—one for each line—the plugs being distributed among the several boards, the two conductors of each cord being attached to the two contact-pieces of its plug, respectively, ground switching devices at the several boards for said plugs, and calling annunciators for said lines, each of said plugs being adapted to be inserted into any of said line-switches at its board, and when inserted to disconnect the two switch contact-pieces which are normally in contact and connect the two contact-pieces of the plug with the two contact-pieces of the switch, respectively, which are connected to the two sides or branches of the line, each of said plugs being normally in position with one of said ground switching devices, whereby one of its contact pieces is normally grounded, said pairs of contact pieces of the switches of a line which are normally in contact being in the circuit of the line between the subscriber's station and the contact-piece of its plug which is normally grounded, and the annunciator of a line being in the circuit of the line between the said pairs of contact pieces of its switches and said normally grounded contact-piece of its plug, substantially as and for the purpose set forth.

3. In a telephone-exchange system, metallic circuit telephone lines, line switching devices at the central office—one for each line—each switch containing three contact pieces, two of which are normally in contact, one of said pieces which are normally in contact being connected to one side or branch of its line, in combination with double or loop plugs with double flexible conductors—one for each line—the two conductors of each cord being attached to the two contact-pieces of its plug, respectively, and the other ends of the conductors being attached to the two sides or branches of their line, respectively, and ground switching devices for said plugs, each of said plugs being adapted to be inserted into any of said line-switches, and when inserted to disconnect the two switch contact-pieces which are normally in contact and connect the two contact-pieces of the plug with the two contact-pieces of the switch, respectively, which are connected to the two sides or branches of the line, each of said plugs being normally in position with one of said ground switching devices, whereby one of its contact-pieces is normally grounded, and said two contact-pieces of a switch which are normally in contact being in the circuit of its line between its subscriber's station and the contact piece of its plug which is normally grounded, substantially as and for the purpose set forth.

4. In a telephone-exchange system, metallic circuit telephone lines, multiple switch boards for said lines, line switching devices for said lines—one for each of said boards—each switch containing three contact-pieces, two of which are normally in contact, the contact-pieces of the switches of a line which are normally in contact being in the circuit of one of the sides or branches of the line, and the other contact-pieces of the switches of a line being connected to the other side or branch of the line, in combination with double or loop plugs with double flexible cords—one for each line—the plugs being distributed among the several boards, the two conductors of each cord being attached to the two contact-pieces of its plug, respectively, and ground switching devices at the several boards for said plugs, each of said plugs being adapted to be inserted into any of said line-switches at its board, and when inserted to disconnect the two switch contact-pieces which are normally in contact and connect the two contact-pieces of the plug with the two contact-pieces of the switch, respectively, which are connected to the two sides or branches of the line, each of said plugs being normally in position with one of said ground switching devices, whereby one of its contact-pieces is grounded normally, said pairs of contact pieces of the switches of a line which are normally in contact being in the circuit of the line between the subscriber's station and the contact-piece of its plug which is normally grounded, substantially as and for the purpose set forth.

5. In a telephone exchange system, a metallic circuit line, the two sides or branches of which are normally open to each other at the central office and one side or branch of which is normally grounded there, in combination with a switch for the line adapted to receive the switch plugs of other lines, and comprising a pair of switch contacts normally closed but open while a plug is in the switch, a switch plug for the line, a plug switching device in which the plug is normally placed, and a pair of contacts which are closed while the plug is in the switching device and opened by the withdrawal of the plug from the device, said branch of the line which is normally grounded passing through said pair of switch contacts and thence through said other pair of contacts to ground, substantially as set forth.

6. In a telephone exchange system, a metallic circuit line, the two sides or branches of which are normally open to each other at the central office and one side or branch of which is normally grounded there, in combination with a switch for the line adapted to receive the switch plugs of other lines, and comprising a pair of switch contacts normally closed but open while a plug is in the switch, a switch plug for the line, a plug switching device in which the plug is normally placed, a pair of contacts which are closed while the plug is in the switching device and opened by the withdrawal of the plug from the device, said branch of the line which is normally grounded passing through said pair of switch contacts and thence through said other pair of contacts to ground, and the line annunciator in circuit between said pairs of contacts, substantially as set forth.

7. In a telephone-exchange system, a metallic circuit line the two sides or branches of which are normally open to each other at the central office, and one side or branch of which is normally grounded there, in combination with switches for the line, one on each of the multiple switch boards, each switch being adapted to receive the switch plugs of the other lines located at its board, and comprising a pair of contacts which are normally closed but opened while a plug is in the switch,—a switch plug for the line, a plug switching device in which the plug is normally placed and a pair of contacts which are closed while the plug is in the switching device and opened by the withdrawal of the plug from the device, said branch of the line which is normally grounded passing successively through said pairs of its switch contact points, and thence through the other pair of contacts to ground, substantially as set forth.

8. In a telephone exchange system, a metallic circuit line, the two sides or branches of which are normally open to each other at the central office, and one side or branch of which is normally grounded there, in combination with switches for the line, one on each of the multiple switch boards, each switch being adapted to receive the switch plugs of the other lines, located at its board, and comprising a pair of contacts which are normally closed but opened while a plug is in the switch, a switch plug for the line, a plug switching device in which the plug is normally placed, a pair of contacts which are closed while the plug is in the switching device and opened by the withdrawal of the plug from the device, said branch of the line which is normally grounded passing successively through said pairs of its switch contact points and thence through the other pair of contacts to ground, and the line annunciator in circuit between said pairs of switch contacts on the one hand, and said other pair of contacts on the other hand, substantially as set forth.

9. In a telephone exchange system, a metallic circuit line, the two sides or branches of which are normally open to each other at the central office and one side or branch of which is normally grounded there, in combination with a switch for the line adapted to receive the switch plugs of other lines, and comprising a pair of switch contacts normally closed but open while a plug is in the switch, a switch plug for the line having a switch contact piece connected by a flexible conductor with said normally grounded side or branch of the line, a plug switching device into which the plug is normally placed and a contact piece in said plug switching device which is connected with the ground and with which said contact piece of the plug forms contact when the plug is inserted into the switching device, said pair of switch contacts being in the circuit of the normally grounded branch of the line, between said contact piece of the plug and the subscriber's station, substantially as set forth.

10. In a telephone exchange system, a metallic circuit line, the two sides or branches of which are normally open to each other at the central office, and one side or branch of which is normally grounded there, in combination with switches for the line, one switch on each board of the multiple switch boards, each switch being adapted to receive the switch plugs of other lines located at its board, and comprising a pair of contacts which are normally closed but open while a plug is in the switch, a switch plug for the line having a switch contact piece connected by a flexible conductor with said normally grounded side or branch of the line, a plug switching device into which the plug is normally placed and a contact piece in said plug switching device which is connected with the ground and with which said contact piece of the plug forms contact when the plug is inserted into the switching device, said pairs of switch contacts being in the circuit of the normally grounded branch of the line between said contact piece of the plug and the subscriber's station, substantially as set forth.

11. In a telephone exchange system, a metallic circuit line, the two sides or branches of which are normally open to each other at the central office, and one side or branch of which is normally grounded there, in combination with switches for the line, one switch on each board of the multiple switch boards, each switch being adapted to receive the switch plugs of other lines located at its board, and comprising a pair of contacts for each switch which are normally closed but open, while a plug is in the switch, a switch plug for the line having a switch contact piece connected by a flexible conductor with said normally grounded side or branch of the line, a plug switching device into which the plug is normally placed, a contact piece in said plug switching device which is connected with the ground and with which said contact piece of the plug forms contact when the plug is inserted into the switching device, said pairs of switch contacts being in the circuit of the normally grounded branch of the line between said contact piece of the plug and the subscriber's station, and the line annunciator in circuit between said pairs of switch contact points and the contact piece of the plug, substantially as set forth.

12. In a telephone exchange system, metallic circuit telephone lines normally grounded at the central office and there only, line switching devices at the central office—one for each line—each switching device containing three contact pieces, two of which are normally in contact, one of said pieces which are normally in contact being connected to one side or branch of its line and the third contact-piece being connected to the other side or branch of its line, double or loop plugs with double flexible cords—one for each line—the two conductors of each cord being attached to the two contact-pieces of its plug, respectively, and the other ends of the conductors being attached to the two sides or branches of their line, respectively, and ground switching devices for said plugs, each of said plugs being adapted to be inserted into any of said line switching devices, and when inserted to disconnect the two switch contact-pieces which are normally in contact and connect the two contact pieces of the plug with the two contact pieces of the switch, respectively, which are connected to the two sides or branches of the line, each of said plugs being normally in position with one of said ground switching devices, whereby one of its contact pieces is normally grounded, said two contact pieces of a switch which are normally in contact being in the circuit of its line, between the subscriber's station and the contact piece of its plug which is normally grounded, in combination with a test-receiving instrument and a battery at the central office in a test wire or circuit grounded at one end, and switch-testing devices adapted, at the will of the operator, to connect the said wire at its other end to the circuit of any line, whether it be switched for conversation or not, substantially as and for the purpose set forth.

13. In a telephone-exchange system, metallic circuit telephone lines normally grounded at the central office, and there only, multiple switch boards for said lines, line switching devices for said lines—one for each line on each board—each switch containing three contact pieces, two of which are normally in contact, the contact pieces of the switches of a line which are normally in contact being in the circuit of one of the sides or branches of the line and the other contact piece of the switches being connected to the other side or branch of the line, double or loop plugs with double flexible cords—one for each line—the plugs being distributed among the several boards, the two conductors of each cord being attached to the two contact-pieces of its plug, respectively, and the other ends of the conductors being attached to the two sides or branches of their line, respectively, and ground switching devices at the several boards for said plugs, each of said plugs being adapted to be inserted into any of said line switches at its board, and when inserted to disconnect the two switch contact pieces which are normally in contact and connect the two contact pieces of the plug with the two contact pieces of the switch, respectively, which are connected to the two sides or branches of the line, each of said plugs being normally in position with one of said ground switching devices, whereby one of its contact pieces is normally grounded, said pairs of contact pieces of the switches of a line which are normally in contact being in the circuit of the line between the subscriber's station and the contact piece of its plug which is normally grounded, in combination with a test-receiving instrument at each board in a test wire or circuit grounded on one side, and with a battery in said test wire or circuit, and switch-testing devices at each board adapted, at the will of the operator, to connect the test-wire in which is the test-instrument at that board on its other side to the circuit of any line, whether it be switched or not, substantially as and for the purpose set forth.

14. In a telephone exchange system, a metallic circuit line, the two sides or branches of which terminate in the two contact-pieces, respectively, of a loop switch plug, a switching device for said plug in which it is normally placed, said plug being adapted to be removed from said switching device and placed in the board switch of another line, in combination with a test circuit normally connected (*i. e.*, when the plug is in its normal position in the switching device) on one side to one of the contact pieces of the plug, and on the other side to a switch-testing plug adapted at the will of the operator to be brought into connection with said line when it is not switched for conversation, and a battery and test instrument or test device in the test circuit thus established, whereby when the switch-plug is in its normal position the test-instrument will sound on the test being made, and when the plug is removed from its normal position, the instrument will not sound, substantially as set forth.

15. In a telephone-exchange system, a metallic circuit line the two sides or branches of which terminate in the two contact-pieces, respectively, of a loop switch plug, a switching device for said plug in which it is normally placed, said plug being adapted to be removed from said device and placed in the switch of another line, in combination with a test circuit connected on one side to a contact-piece of the switching device with which one of the contact-pieces of the plug is in contact when inserted into the device, said circuit being connected on its other side to a switch-testing plug adapted, at the will of the operator, to be brought into connection with said line when it is not switched, and a battery and test-receiving instrument in the test-circuit, whereby, when the switch plug is in its normal position, the test-receiving instrument will sound on the test being made, and when the plug is removed from its normal position the instrument will not sound, substantially as set forth.

16. In a telephone-exchange system, two metallic circuit lines, in combination with double or loop switch plugs,—one for each line—in the two contact pieces of which the two sides or branches of the line respectively terminate, switches,—one for each line—each switch having two contact-points normally in contact in the circuit of one of the sides or branches of its line, a switching device for each plug, in which the plug is normally placed, each switching device having a contact-piece which, when the plug is inserted into the device is in connection with that side or branch of the line in which are said contact-points of its switch and then only, a test-receiving instrument and a battery in a test-circuit connected on one side of the instrument and battery to said contact pieces of said switching devices, and a switch testing plug or device connected to said test-circuit on the other side of said instrument and battery, and adapted, at the will of the operator, to be brought into connection with either line when it is not switched, whereby, when the lines are in their normal condition, the test-receiving instruments will sound on a test being made, and when the lines are switched for conversation by the switch plug of one line being removed from its normal position and placed in the switch of the other line they are disconnected from the test-receiving instrument and it will not sound on a test being applied, substantially as set forth.

17. In a telephone exchange system, metallic circuit lines and double or loop plugs located at a central office switch board,—one plug for each line—in the two contact-pieces of which the two sides or branches of the line terminate, in combination with a switching device at the board containing two contact-pieces connected to the two sides, respectively, of the operator's telephone said contact-pieces of said switching device being adapted to have the two contact-pieces of any of said loop-plugs applied to or brought into contact with them, respectively, whereby the operator may, by thus applying any loop-plug to said switching device, loop her telephone into the circuit of the line to which the plug belongs, substantially as set forth.

18. In a telephone exchange system, metallic circuit lines each having a loop switch plug to the two contact pieces of which are connected respectively the two sides or branches of its line and which is adapted to be placed in the switch of either of the other lines and connect its two contact-pieces with the two sides or branches of such other line, in combination with an operator's telephone and a switching device or apparatus for each operator by which the operator may at will connect the two sides of her telephone to the two sides or branches respectively, of either of said lines, substantially as set forth.

19. In a telephone exchange system, metallic telephone lines, line switching devices at the central office,—one for each line—having contacts connected with the line, substantially as set forth, in combination with double or loop plugs with double flexible conductors being attached to the two contact pieces of the plug, respectively—one for each line—, and the opposite ends of the conductors being attached to the two sides or branches of their line, respectively, and a switch W or X interposed between one of the plug-contacts and its side of the line, said switch having three sets of connections or contacts,—viz;—one making the circuit through a conducting-loop, another through a calling battery, and another through a telephone, substantially as and for the purpose set forth.

20. In a telephone exchange system, a metallic circuit line normally connected with the ground at the central office, and disconnected from the ground while switched for conversation, in combination with a test-receiving instrument grounded on one side, a switch-testing plug or device adapted, at the will of the operator, to be brought into connection with said line, and a battery in circuit with the instrument between the ground and the switch-testing plug, substantially as set forth.

21. In a telephone exchange system, a metallic circuit line normally connected with the ground at the central office and switching apparatus to disconnect it from the ground while it is switched for conversation, in combination with a test receiving instrument grounded on one side, a switch testing plug or device connected to the other side of the instrument and adapted at the will of the operator to be brought into connection with said line and a battery in circuit with the instrument between its ground and the switch testing plug, substantially as set forth.

22. In a telephone exchange system, multiple switch boards, metallic circuit lines, each normally grounded at the central office and switching devices at each board to connect any two of said lines together for conversation and when they are thus connected to disconnect the lines from the ground, in combination with test receiving instruments, one at each board each grounded on one side and connected on its other side to a switch testing plug or device adapted, at the will of the operator, to connect the test receiving instrument with any line when it is not switched for conversation, and an electric battery in circuit with the test receiving instrument between its ground and switch testing plug, substantially as set forth.

23. In a telephone exchange system, multiple switch boards, metallic circuit lines normally disconnected from the ground at the subscriber's stations and a switch on each board for each line, each switch containing a pair of contact-points or pieces normally in contact and a third contact point or piece insulated from the rest of the apparatus, (except by the line connections) one of the sides or branches of each of the lines passing through the pairs of contact pieces of its switches and to a common ground wire or connection, and the other side or branch of each line being connected to said normally insulated contact pieces of its switches, and loop switch plugs, one for each line in which the sides of the line terminate, each adapted to be inserted into the switches and when one is inserted to disconnect the pair of contact points which are normally in contact and connect the two sides or branches of the line with the two contact pieces of the plug, respectively, in combination with test receiving instruments, one at each board, each instrument being grounded on one side and connected on its other side to a test plug or device adapted to be brought into connection with any of the normally insulated contact pieces at its board and a battery in the test circuit thereby established, substantially as set forth.

24. In a telephone exchange system, two or more metallic circuit lines, a local test wire at the central office, one side of which is normally connected to one side or branch of each of said lines, and the other side of which is connected to a switch testing device adapted, at the will of the operator, to bring said side into connection with the other side or branch of each of said lines and a battery in the test circuit thereby established, in combination with a switching device for each line to break said normal connection between the line and said local test wire and a test receiving instrument in said local test wire, substantially as set forth.

Signed at New York, N. Y., this 16th day of January, 1891.

MILO G. KELLOGG.

Witnesses:
FRANK S. OBER,
EDWARD C. DAVIDSON.